J. H. CLUNE.
PNEUMATIC TIRE.
APPLICATION FILED JAN. 17, 1914.

1,124,705.

Patented Jan. 12, 1915.

Witnesses:
H. E. Hartwell.
Caroline N. Willis.

Inventor:
John H. Clune.
By Chapin & Co.
Attorney.

UNITED STATES PATENT OFFICE.

JOHN H. CLUNE, OF SPRINGFIELD, MASSACHUSETTS.

PNEUMATIC TIRE.

1,124,705.  Specification of Letters Patent.  Patented Jan. 12, 1915.

Application filed January 17, 1914. Serial No. 812,664.

*To all whom it may concern:*

Be it known that I, JOHN H. CLUNE, a citizen of the United States, residing in the city of Springfield, county of Hampden, and State of Massachusetts, have invented certain new and useful Improvements in Pneumatic Tires, of which the following is a specification.

This invention relates to improvements in pneumatic tires and the object of the invention is to provide a tire structure that will automatically prevent the vehicle to which it is attached from skidding when traveling over the surface of a slippery pavement or street.

The invention, in general, consists in inserting one or more strips of hard or vulcanized rubber within the tread portion of the tire, the dimension or sectional area of this strip being less than the area of the recess in which the strip is located whereby when that portion of the tire adjacent the inserted strip is compressed, as in passing around a curve, the inserted piece of vulcanized rubber will serve as an abutment or shoulder to prevent skidding, as will be fully described in the body of the specification and particularly pointed out in the claims.

Figure 1:
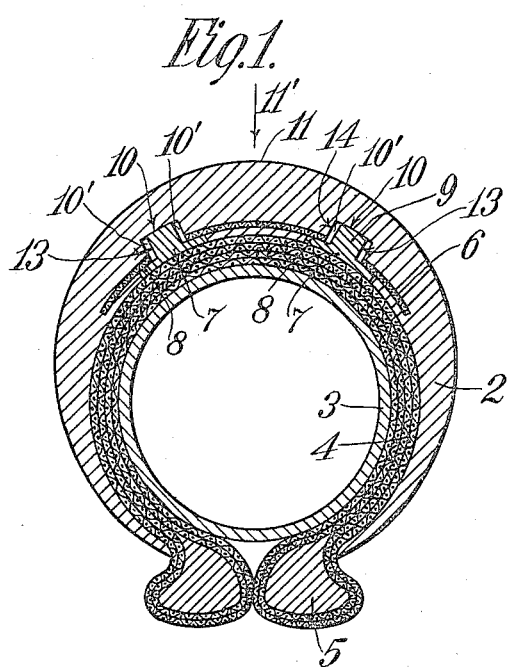
Figure 2:
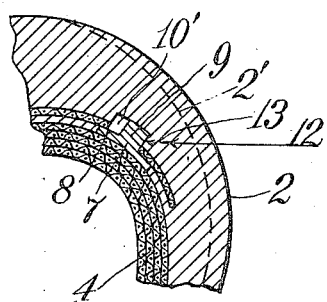

Referring to the drawings: Figure 1 is a transverse sectional view through the axis of the tire, showing the position of the inserted pieces of hard rubber with relation to the tread surface of the tire. Fig. 2 is a detail sectional view of a portion of the tire to illustrate the relative position of rib and tread portion of the tire when subjected to a transverse action of the vehicle as when turning a sharp curve and causing the tread portion to be compressed firmly against the inserted strip to form an abutment within the tire to prevent skidding.

Referring to the drawings in detail: 2 designates the outer or tread portion of the tire usually composed of rubber or other elastic material.

3 designates the inner tube and 4 the layers of rubberized fabric material forming the body or carcass portion of the tire. The base portion of the tire is provided with the usual enlarged ribs for attachment to the felly or rim of the wheel. A breaker or puncture-proof strip is indicated at 6. Secured to the rubberized fabric 4 are strips of hard rubber constituting insert pieces 7, each of which is formed with a broad base-portion 8 and a rib-portion 9. The base portion of the rib is permanently secured to the fabric 4 and breaker strip 6 by means of vulcanization during the process of manufacture. The rib part 9 of the insert pieces is located in channels or passageways 10 of the tread portion 2, the dimensions of which are larger or wider than the rib portion 9, as shown in the drawings and indicated at 10'. During the normal operation of the tire, when the vehicle is in use, the pressure or weight of the vehicle is borne by the center portion 11 of a tire, as indicated by the arrow 11', but, should the vehicle be suddenly turned from a straight line or course, during its travel, the rubber tread part 2 would be compressed out of normal, as indicated in Fig. 2 at 2'. This pressure of the tire on the roadway would then be substantially in the direction of the arrow 12; forcing the rubber tread portion 2 of the tire against the rib portion 9 which would then serve as an abutment to prevent the machine from skidding or sliding on a slippery pavement or roadway.

It may be stated that during the normal operation of the tire, when the machine is traveling in a straight course, that the pressure on the part 11 serves to force the rubber composing the tread portion 2 in opposite directions from the vertical plane passing through the axis of the tire. This, in a measure, would prevent the vehicle from skidding, and would close up the openings 10' on the opposite sides of the rib-portion 9 between the ribs 9 and the walls 14 of the passageways 10. It will therefore be seen that by reason of the passageways 10 being larger than the ribs 9 that the compression of the tread can operate in opposite directions to prevent the machine from skidding.

What I claim is:—

1. A tire construction, comprising a body portion and a tread portion, the body portion having ribs secured thereto and the tread portion being formed with openings or channels therein to receive the ribs, the transverse sectional area of the ribs being less than the transverse sectional area of the channels, whereby when the tread portion is compressed or moved against the ribs, a shoulder or abutment to prevent skidding is provided, as described.

2. A tire construction, comprising a body portion and a tread portion, the tread portion having a channel-way therein and located adjacent the material forming the body portion of the tire, a rib composed of material harder than the tread portion and located within the passageway, said rib being secured to the body part of the tire, the size of the passageways in the tread portion being greater than the size of the ribs, whereby upon compression of the tread the ribs will serve to prevent skidding, as described.

JOHN H. CLUNE.

Witnesses:
HARRY W. BOWEN,
H. E. HARTWELL.